US007117338B2

(12) United States Patent
Brewer

(10) Patent No.: US 7,117,338 B2
(45) Date of Patent: *Oct. 3, 2006

(54) VIRTUAL MEMORY ADDRESS TRANSLATION CONTROL BY TLB PURGE MONITORING

(75) Inventor: Tony M. Brewer, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 51 days.

This patent is subject to a terminal disclaimer.

(21) Appl. No.: 10/650,105

(22) Filed: Aug. 25, 2003

(65) Prior Publication Data

US 2004/0221131 A1 Nov. 4, 2004

Related U.S. Application Data

(63) Continuation of application No. 08/881,196, filed on Jun. 24, 1997, now Pat. No. 6,668,314.

(51) Int. Cl.
*G06F 12/10* (2006.01)

(52) U.S. Cl. .................. 711/207; 711/202; 711/206; 711/208

(58) Field of Classification Search ............ 711/1, 711/100, 202, 205, 206, 207, 208, 209
See application file for complete search history.

(56) References Cited

U.S. PATENT DOCUMENTS 4,456,954 A * 6/1984 Bullions et al. ............ 711/207
4,733,348 A   3/1988 Hiraoka et al.
5,574,878 A   11/1996 Onodera et al.
5,574,936 A   11/1996 Ryba et al.
5,710,903 A   1/1998 Horiuchi et al.
5,906,001 A   5/1999 Wu et al.
5,966,733 A * 10/1999 Brewer ....................... 711/170
6,668,314 B1 * 12/2003 Brewer ....................... 711/207

FOREIGN PATENT DOCUMENTS

JP  59227098 A  * 12/1984
JP  60254346 A  * 12/1985

OTHER PUBLICATIONS

Microsoft Press Computer Dictionary, Second Edition. 1994. Microsoft Press, Redmond WA, p. 412.*
The Authoritative Dictionary of IEEE Standards Terms, Seventh Edition. 2000. IEEE, New York, NY, pp. 1256-1257.*

* cited by examiner

*Primary Examiner*—B. James Peikari

(57) ABSTRACT

In a computer system, an architecture is disclosed for optimizing aspects of data movement operations by performing functions such as memory allocation and notification on hardware rather than software. In this environment, the claimed invention is a method and apparatus for ensuring the integrity of data movement operations from virtual memory. The invention monitors and detects Translation Lookaside Buffer ("TLB") purges, a hardware-based operation whose occurrence signals that virtual-to-physical mapping has changed. Responsive to detection of a TLB purge during the set up or execution of a data movement operation, the claimed invention aborts the operation, and then enqueues corresponding completion status information to notify processors of the event.

16 Claims, 8 Drawing Sheets

VIRTUAL MEMORY ADDRESS TRANSLATION CONTROL BY TLB PURGE MONITORING

CROSS REFERENCE TO RELATED APPLICATIONS

This application is a continuation of U.S. patent application Ser. No. 08/881,196, filed on Jun. 24, 1997, entitled "VIRTUAL MEMORY TRANSLATION CONTROL BY TLB PURGE MONITORING," issued as U. S. Pat. No. 6,668,314 on Dec. 23, 2003.

TECHNICAL FIELD OF THE INVENTION

This invention relates generally to memory management on computers, and more specifically to a method and apparatus for ensuring the integrity of data movement operations from virtual memory. The invention is operable in an environment in which data movement is performed largely by hardware rather than software, and is enabled responsive to monitoring and detection of Translation Lookaside Buffer ("TLB") purges.

BACKGROUND OF THE INVENTION

Data movement is an important "core" function of systems, incorporated into many standard, regularly-used system operations such as messaging, data copying or clearing memory to zero. Data movement in systems typically involves three general steps. First, memory is allocated to enable the movement of the data. Second, the data movement itself is performed. Third, the system notifies appropriate components, such as processors or processor agents, that the data movement has completed successfully and processing can continue based on the new location of the data.

In systems of the current art, the first and third steps (memory allocation and notification) are typically performed by software, while the second step (data movement) is performed by hardware. The data movement hardware typically includes a message/copy state machine, an expensive hardware component whose operations are pivotal to enabling the data movement.

The software operations for the first and third steps of data movement (memory allocation and notification) inevitably require several machine cycles to complete. The software is typically found in microkernels loaded onto memory nodes that are local to the processor issuing the request requiring a data movement operation. It would thus be highly advantageous to be able to perform these first and third steps on hardware, obviating the need to refer to microkernel software, thereby speeding up the processing time to execute a data movement operation.

It will be appreciated, however, that hardware-driven data movement operations must also ensure the integrity of virtual-to-physical memory mapping while the operation is in progress. In a more software-driven data movement environment, this function would normally be performed by the processor hardware. There is therefore a need for a non-processor hardware-oriented mechanism to ensure the integrity of such mapping as part of hardware-driven data movement operations.

SUMMARY OF THE INVENTION

As used herein, "architecture" means the way in which computer design, hardware and software interact in order to provide a planned level of capability and performance. As used herein, "architecture configuration" means the topological layout of the physical structure of a computer's internal operations, including its processors, registers, memory, instruction set and input/output resources, as designed to enable a particular predetermined architecture.

The claimed invention operates in an architecture in which data movement in systems is optimized by performing operations integral to data movement, such as memory allocation and notification, with hardware rather than software.

As a result, many system operations involving data movement are correspondingly also optimized. Internodal messaging is a good example. It is common in systems having globally shared memory to allow a microkernel resident on one memory node to send messages to microkernels resident on other memory nodes. Where data movement involves memory allocation and notification steps performed by software, however, processor efficiency usually dictates that these messages be restricted in length to a single cache line length. Four common cache line lengths used in the art today are 16 bytes, 32 bytes, 64 bytes, and 128 bytes. Messages from one microkernel to another microkernel typically need to be significantly longer than these fixed single cache line lengths, however. A restriction holding messages to 32 bytes in length, for example, therefore places significant overhead burden on the operating system to limit messages to multiple 32-byte "containers." This overhead burden inevitably causes performance degradation.

Data movement under architecture as disclosed herein, however, allows contiguous messages of unrestricted length to be sent from one node to another in multiple cache lines. The overall message length is specified by a completion status that is posted by the sending node when the operation is complete. This type of unrestricted messaging is enabled by empowering the message/copy state machine to perform memory allocation and notification operations as well as data movement operations. With the restriction on internodal messaging lifted, the system is freed of the overhead burden. In freeing the system of this overhead, therefore, system processing efficiency may be leveraged far in excess of the actual efficiency achieved at the physical data movement level.

Data copying is an example of a system operation involving data movement that is optimized by the claimed invention. Optimization is particularly enhanced in operations involving data copying from a virtual page in memory. Virtual pages must first be translated to physical pages. While the data copy operation is being issued and executed, however, other components of the system, running concurrently, may change the physical mapping relied upon to translate the virtual page to the physical page. In systems of the current art, monitoring of this mapping to maintain translation accuracy is performed by processor hardware. In a preferred embodiment of the claimed invention, this monitoring is additionally performed by non-processor hardware. Changes to the mapping generate a translation lookaside buffer ("TLB") purge, the occurrence of which is monitored and detected by a mechanism disclosed herein. When a TLB purge is detected, the mechanism stops the data copy operation and enqueues status information regarding the point at which data transfer stopped, thereby ensuring forward progress from that point once accurate mapping is re-established and data transfer re-starts.

Pipelining is an example of a design optimization in which utilization of the pipelined functions is increased. System operation involving data movement may be optimized by utilizing pipelining as disclosed herein. In creating a "pipeline," a series of functions or operations is set up to be executed concurrently, consecutively, or overlapping, as predefined. Individual cycles or instructions of different pipelined operations are executed together to give the overall effect of simultaneous processing of all pipelined operations. Pipelining such as disclosed herein enhances an architecture by being available to concurrently execute individual data movement instructions as they come down the pipeline. It will thus be appreciated that the pipeline may potentially present a stream of data movement instructions (e.g. allocate memory, move data, notify) each taken from various concurrently pipelined data movement operations. Data movement hardware (such as the message/copy state machine) may thus be put to almost continuous use, and to capacity, "picking and choosing" among data movement instructions from various pipelined operations as they come down the pipeline. It will be seen that the overall effect is to optimize the pipeline by speeding up pipelined data movement instructions on an almost continual basis.

In a preferred embodiment, the architecture configuration in which the claimed invention operates comprises a processor agent having (1) first input registers receiving data from a first processor and second input registers receiving input from a second processor; (2) a Message/Copy State Machine receiving control information from the input registers; (3) a data mover; (4) a means for pipelining discrete data movement operations in an overlapping environment; and (5) a first status queue receiving control information from the message/copy state machine to be dispensed to the first processor and a second status queue receiving control information from the message/copy state machine to be dispensed to the second processor. The architecture configuration of a preferred embodiment further includes a memory access controller in communication with the processor agent, the memory access controller having (1) a means, responsive to control information from the message/copy state machine, for allocating memory to enable an operation; (2) a message allocation state machine also operating responsive to control information from the message/copy state machine; and (3) a message completion status queue also operating responsive to control information from the message/copy state machine.

It is therefore a technical advantage of the claimed invention to optimize data movement operations by enabling a hardware-based alarm system for detecting and responding to TLB purges.

It is a further technical advantage of the claimed invention to ensure the integrity of virtual-to-physical memory mapping during operations such as data movement when such operations are performed largely by hardware. This integrity is ensured by enabling a hardware-based alarm system for detecting and responding to TLB purges which may affect data movement operations.

The foregoing has outlined rather broadly the features and technical advantages of the claimed invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the claimed invention. It should also be realized by those skilled in the art that such equivalent constructions do not depart from the spirit and scope of the invention as set forth in the appended claims.

BRIEF DESCRIPTION OF THE DRAWINGS

For a more complete understanding of the claimed invention, and the advantages thereof, reference is now made to the following descriptions taken in conjunction with the accompanying drawings, in which:

DESCRIPTION OF THE PREFERRED EMBODIMENTS

As already noted, the claimed invention is operable in an architecture in which data movement in systems is optimized by performing operations integral to data movement, such as memory allocation and notification, with hardware rather than software.

In a preferred embodiment, an exemplary architecture configuration comprises a processor agent having (1) first input registers receiving data from a first processor and second input registers receiving input from a second processor; (2) a Message/Copy State Machine receiving control information from the input registers; (3) a data mover; (4) a means for pipelining discrete data movement operations in an overlapping environment; and (5) a first status queue receiving control information from the message/copy state machine to be dispensed to the first processor and a second status queue receiving control information from the message/copy state machine to be dispensed to the second processor. The architecture configuration of a preferred embodiment further includes a memory access controller in communication with the processor agent, the memory access controller having (1) a means, responsive to control information from the message/copy state machine, for allocating memory to enable an operation; (2) a message allocation state machine also operating responsive to control information from the message/copy state machine; and (3) a message completion status queue also operating responsive to control information from the message/copy state machine.

Figure 1A:
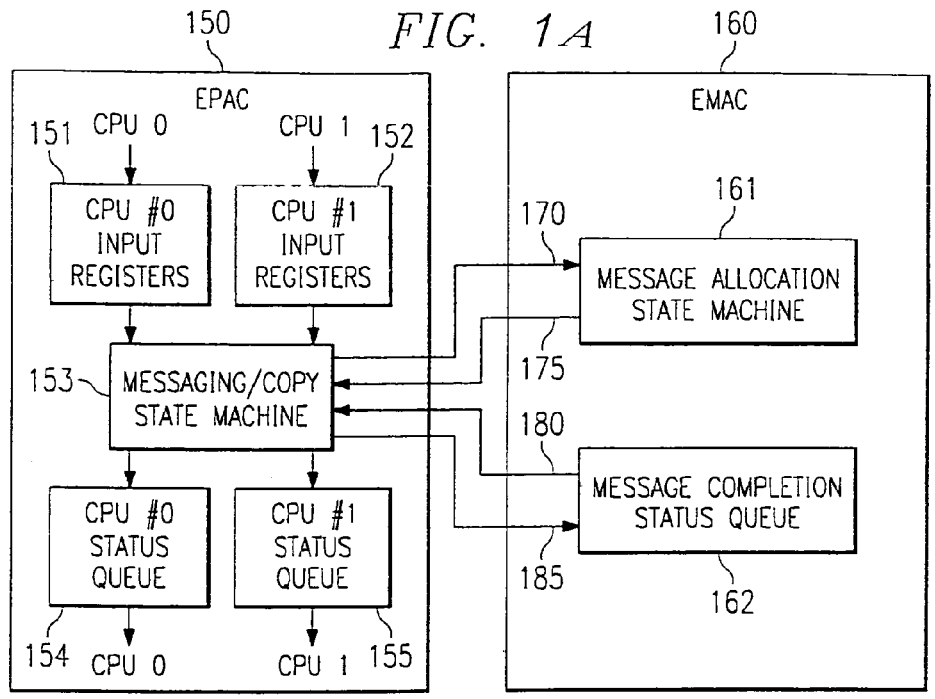
FIG. 1A is a block diagram illustrating an exemplary architecture configuration in which the claimed invention is operable.

With reference to FIG. 1A, therefore, there is illustrated an exemplary architecture configuration in which the claimed invention is operable, in which EPAC (Excalibur Processor Agent Chip) 150 includes CPU Input Registers 151 and 152 (corresponding to CPU 0 and CPU 1 respectively) available to Message/Copy State Machine 153. As part of data movement operations, and particularly advantageous in the notification phase of data movement, Message/Copy State Machine 153 sends information to CPU Status Queues 154 and 155. CPU Status Queues 154 and 155 again correspond to CPU 0 and CPU 1 respectively, and are also resident on EPAC 150.

EPAC 150, via Message/Copy State Machine 153, is also in data communication with EMAC (Excalibur Memory Access Chip) 160, which comprises Message Allocation State Machine 161 and Message Completion Status Queue 162.

Under the claimed invention, data movement operations are enabled almost exclusively using hardware as illustrated on FIG. 1A. Traditionally, phases or aspects of data movement such as memory allocation and notification are enabled by software. As will be described below with respect, for example, to messaging, these phases or aspects are enabled by hardware under the invention.

Figure 14:
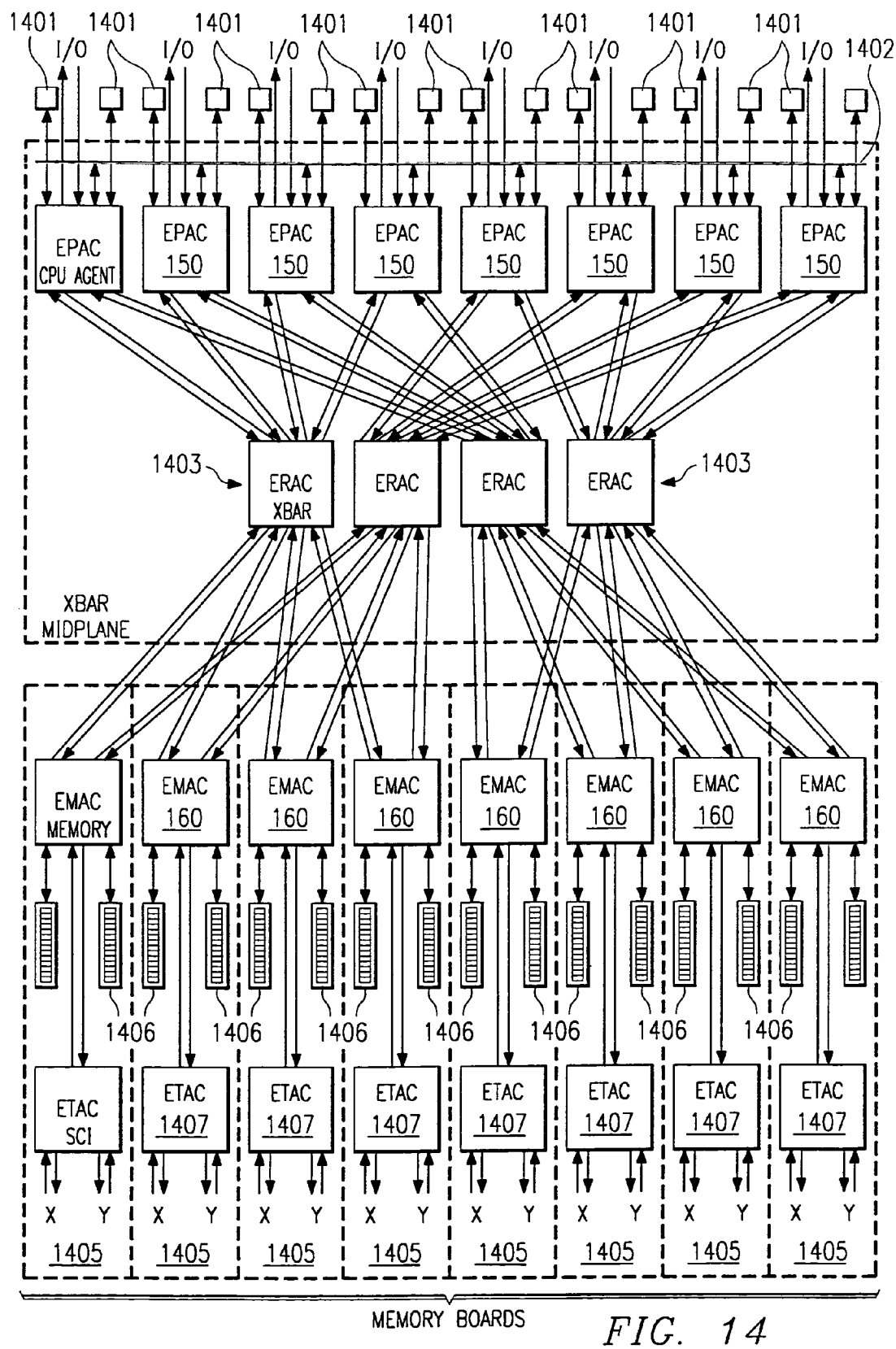
FIG. 14 is a block diagram illustrating, at a functional level, an exemplary architecture configuration in which the claimed invention is operable in a multi-processor, multi-node system.

First, however, it is useful to visualize the hardware components of FIG. 1A in a larger perspective reflecting a multi-processor, multi-node environment. With reference to FIG. 14, therefore, there is illustrated an exemplary architecture configuration showing the interaction of EPAC 150 and EMAC 160 with other hardware in such an environment. EPACs 150 are attached to processors 1401 (advantageously 2 processors per EPAC). As illustrated on FIG. 14, an IIO subsystem may also be attached to each EPAC using unidirectional paths. Additionally, EPACs 150 are attached to core logic bus 1402, through which EPACs 150 may interface other computer system components such as Electrically Erasable Program Read Only Memory ("EEPROM"), Static Random Access Memory ("SRAM"), real time clock, RS-232 and ethernet. Core logic bus 1402 also enables processors 1401 to write to Control and Status Registers ("CSRs") which are accessed using the bus to initialize and configure cross bar gate arrays ("ERACs") 1403.

It will be seen from FIG. 14 that EPACs 150 send and receive transactions from ERACs 1403. In the preferred embodiment, four unidirectional data paths are used to enable this communication, each EPAC 150 communicating with two ERACs 1403.

ERACs 1403 form a cross bar that forwards transactions from EPACs 150 to EMACs 160. In a preferred embodiment, data paths to and from ERACs 1403 are 32-bits wide and are unidirectional. ERACs 1403 form a cross bar without CSR space of its own. Instead, as noted above, ERACs 1403 are initialized by writes to CSRs resident on core logic bus 1402. These CSRs control which ports are active, as well as enabling error detection.

In the exemplary architecture configuration illustrated in FIG. 14, each ERAC 1403 exchanges transactions with four EMACs 160. In combination, EMACs 160 control access to coherent memory. Advantageously, four memory banks 1406 are controlled by each EMAC 160, allowing up to 32 banks in an eight-EMAC system. Memory banks 1406 consist of SIMMs of synchronous DRAMs. The memory controlled by an EMAC 160 is used for node local memory, network cache and messaging.

FIG. 14 also illustrates ring interface controllers ("ETACs") 1407 exchanging transactions with EMACs 160. Each ETAC 1407 interfaces with two operating platform rings (x-dimension and y-dimension), said interfaces enabling the rings to access memory via EMACs 160.

In operation according to the exemplary architecture configuration illustrated on FIG. 14, processors 1401 access memory banks 1406 by sending a request via the corresponding EPAC 150 to cross bar ERACs 1403. EMAC 160 accesses an available memory bank 1406, checking ECC and any tagged coherency information. Provided no additional coherency operations are required, the data accessed from memory 1406 is returned to the requesting processor 1401 via ERAC 1403 and corresponding EPAC 150.

It will also be appreciated that in addition to FIG. 14, other implementations of architecture and topology enabling the claimed invention are possible.

As noted earlier, therefore, the claimed invention operates when phases or aspects of data movement (such as memory allocation or notification) are enabled in hardware rather than software. This is best demonstrated by reference to a common data movement operation in computer processing, namely messaging. It will be appreciated, however, that the following description with regard to messaging is but one example of an application in which the claimed invention is operable, and that the claimed invention applies equally to other data movement operations.

Figure 1B:
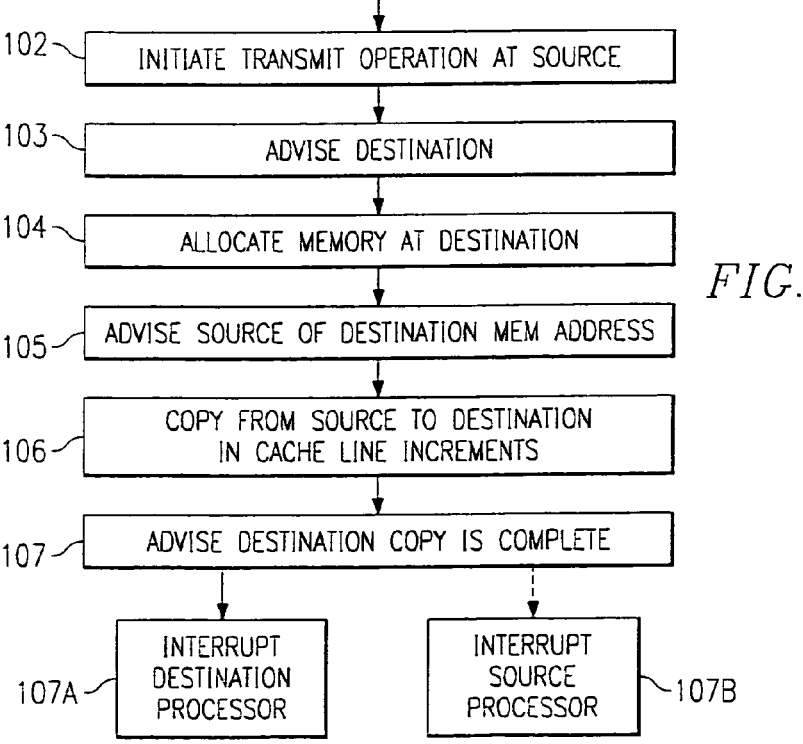
FIG. 1B is a flow diagram illustrating the steps undertaken by the architecture configuration of FIG. 1A to enable internodal messaging of unrestricted length.

Turning now to FIG. 1B, messaging begins at block 101, in which the source processor formats the message to be sent. The message may be of any length. The actual formatting of the message is done by software and is performed using system memory.

In block 102, the source processor issues a command to commence the messaging operation. This command is issued to the hardware on the local node by writing to input command registers on the local processor agent (EPAC 150 on FIGS. 1A and 14).

In block 103, a Message/Copy State Machine within the EPAC sends a transaction to the memory access controller (EMAC 160 on FIGS. 1A and 14) on the receiving node. This transaction is directed to the message allocation state machine within the receiving EMAC (item 161 on FIG. 1A), and includes the source address of the message in memory and the size of the message.

In block 104, the EMAC message allocation state machine allocates memory on the receiving node from a pool of memory under its control. The amount of memory allocated corresponds to the size of the message that has to be stored therein. The EMAC then sends a transaction back to the message/copy state machine (item 153 on FIG. 1A) within the source EPAC, where that message includes the destination address that has been allocated by the receiving EMAC in receiving node memory (block 105).

In block 106, the source processor copies the message from the source memory to the destination memory in increments of cache line length quantities. In a preferred embodiment, this cache line length is 32-bytes, although any line length is operable. Note that in copying the message, the cache line length increments may be sent in any order, and in combination with other messages being sent simultaneously from the source node to the destination node. As a result, processing overhead may be optimized.

Once the entire message has been successfully copied, the source node sends a completion status to the receiving node (block 107). The sending of the completion status is enabled by the Message/Copy State Machine on the source EPAC sending a completion status transaction to the EMAC on the receiving node. The EMAC then enqueues the completion status transaction in a queue for that node (item 162 on FIG. 1A). When an empty queue enqueues a completion status (i.e. the queue transitions from empty to non-empty), an interrupt is sent to a processor local to that node so that software can process the received message (block 107A). An interrupt is optionally also sent to the sending processor (block 107B). In this way, the sending processor will know that the messaging operation has completed and that it can proceed accordingly.

Further discussion of enablement of a preferred embodiment will now be with specific reference to Hewlett-Packard*s "Excalibur" product, which implements the invention in an environment having exemplary 32 byte cache lines. It will be appreciated, however, the Excalibur product is but one possible enablement of the invention as claimed below, and that the invention is not limited to specific details of the Excalibur product.

With reference again to FIG. 1A, therefore, messaging will now be described by reference to specific hardware components. EPAC 150 is resident at the source or sending node from which a message is desired to be sent. EMAC 160 is resident on the receiving or destination node for the message. As noted above, EPAC 150 comprises CPU Input Registers 151 and 152 available to be programmed by two separate processors CPU 0 and CPU 1 respectively. EPAC 150 further comprises Message/Copy State Machine 153, and CPU status queues 154 and 155 available to condition processors CPU 0 and CPU 1 respectively. EMAC 160 comprises message allocation state machine 161 and message completion status queue 162.

Input Registers 151 and 152

EPAC 150 has two sets of Input Registers for dedicated use by two processors CPU 0 and CPU 1 physically attached hereto. To initiate an operation, a processor must first determine that the last operation it initiated is no longer in the Input Register stage. Once the Input Registers are available, a processor initiates an operation by programming the Input Registers.

Message/Copy State Machine 153

The Message/Copy State Machine 153 will start executing a messaging operation when a set of Input Registers have been set up and the Message/Copy State Machine is idle. If both sets of Input Registers have operations ready to execute then the hardware will arbitrate between the two sets of Input Registers to guarantee forward progress.

The execution of a messaging operation is divided into three phases. The first phase is determining the destination address for the message. If the current operation is a copy operation then this phase of execution is skipped. As shown in FIG. 1A, the destination address is determined by sending transaction 170 to EMAC 160 on the destination node. EMAC 160 performs a memory allocation operation and responds with a destination node memory address (transaction 175).

The second phase is to copy data from the source memory to the destination memory. The copy operation will execute until the operation is complete, a translation lookaside buffer ("TLB") purge occurs, or an error occurs.

The last phase of execution is to send message completion transaction 185 to EMAC 160. This phase is not performed if the operation is a data copy. EMAC 160 then enqueues the completion status in a memory based queue (item 162) and informs a processor on the destination node of the message via an interrupt.

Operation Status Queues 154 and 155

An operation status queue 154 and 155 is associated with each processor physically connected to EPAC 150. On FIG. 1A, these processors are CPU 0 and CPU 1. Status resulting from the completion of a message or copy operation is placed in one of the two status queues. An operation started by CPU 0 when complete will write status to its assigned status queue 154. Similarly, CPU 1's status will be written to status queue 155. Each status queue is three entries deep to provide status space for the Input Register and Message/Copy State Machine stages.

Once status is enqueued, an interrupt may be sent to the processor which initiated the operation to inform it that the message has been delivered.

FIGS. 2A through 11 describe the CSRs (Control and Status Registers) which are required to control the messaging and data copy hardware. All CSRs reside either in EPAC 150 or EMAC 160 as illustrated on FIG. 1A. CSRs include:

Input Command register
Operation Context register
Source and Destination Physical Page Frame registers
Source and Destination Offset registers
Operation Status register
Message Reception Area Configuration registers
Message Reception Area Offset registers
Message Completion Queue Configuration registers
Message Completion Queue Offset registers
Memory Allocation address
Message Completion Enqueue address
Message Completion Dequeue address Input Command Register Each EPAC 150 has two input command registers that set various modes and the length of messaging and data copy operations.

The Input Command register can be written when the Ready bit of the CSR is zero and the CSR Operation Context register Armed bit is a one. There are no restrictions for reading this register.

Figure 2A:
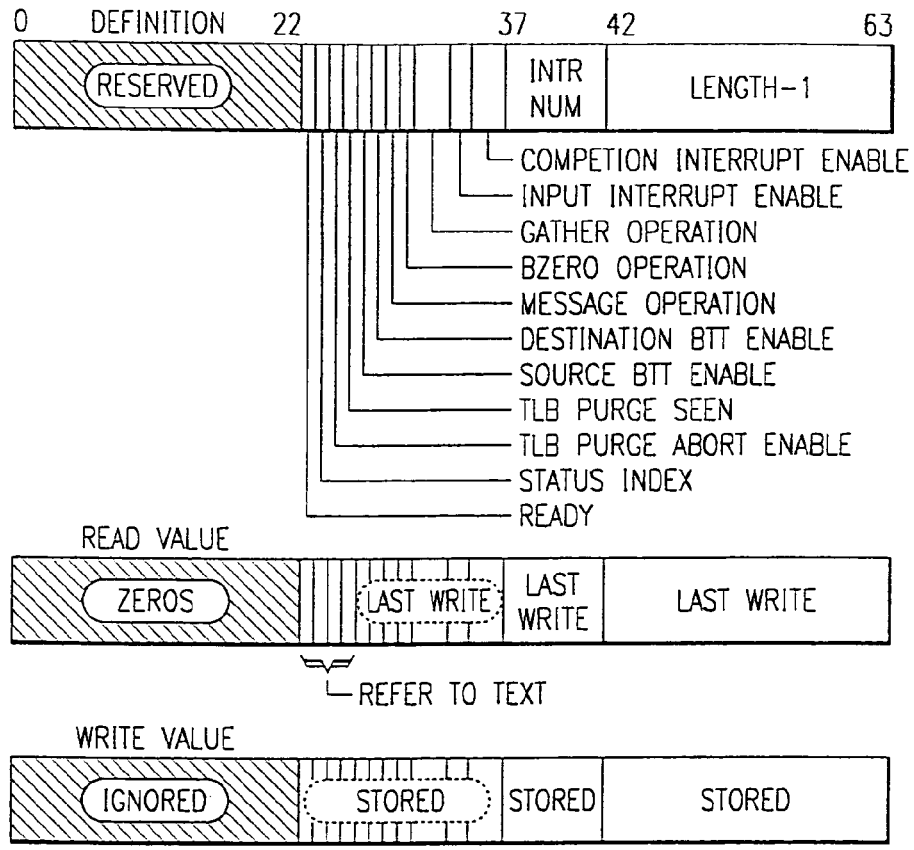
FIG. 2A illustrates the layout of the Input Command register in a preferred embodiment enabling the claimed invention.

The format of the Input Command register is shown in FIG. 2A. The fields of the Input Command register are defined as follows:

Ready field (bit 23)—Indicates that the input registers are ready to perform an operation. Normally, this bit is set by software and cleared by hardware. It should be set by software when the input registers are completely set up for an operation. Hardware clears it when the messaging and copy state machine has accessed all required information from the input registers for the operation. The Ready bit is written by a CSR write access. A CSR read will read the current value. Reset clears the bit.

Status Index field (bits 24:25)—Is used by software for completion status queue management. The field is read by a CSR read. The value of the field is part of the status in the operation completion status queue. Reset clears the field.

TLB Purge Abort Enable field (bit 26)—Enables an operation to be aborted if a TLB purge transaction is detected prior to or during the operation. In system operation, software sets and clears the bit. It should be set by software when a virtual address is being used. Note that the operation is aborted prior to starting if the TLB Purge Seen and TLB Purge Abort Enable bits are set at the time the messaging and copy state machine starts the operation. Completion status for an aborted operation is written to the appropriate status queue. The TLB Purge Abort Enable bit is written by a CSR write and read by a CSR read. Reset clears the bit.

TLB Purge Seen field (bit 27)—Indicates that a TLB purge transaction was detected by an EPAC. The bit is cleared by software and set by hardware. It is written by a CSR write. A CSR read will read the current value. Reset clears the bit.

Source BTT Enable field (bit 28)—Indicates the Source Physical Page Frame register contains the address of the Block Translation Table ("BTT") used for accessing the source memory region of the operation. The bit is written by a CSR write and read by a CSR read.

Destination BTT Enable field (bit 29)—Indicates the Destination Physical Page Frame register contains the address of the Block Translation Table used for accessing the destination memory region of the operation. The bit is written by a CSR write and read by a CSR read.

Messaging Operation field (bit 30)—Forces the messaging and copy state machine to use the messaging mechanism to determine the destination address rather than the destination address of the input registers. The bit is written by a CSR write and read by a CSR read.

Bzero Operation field (bit 31)—Forces the messaging and copy state machine to clear the destination memory region rather than copy the source to destination memory region. The bit is written by a CSR write and read by a CSR read.

Gather Operation field (bits 32-33)—specifies the stride used for a gather operation. Currently, this field is not implemented and read as zero.

Input Interrupt Enable field (bit 34)—Enables an interrupt to the associated processor when the Input Command register is available for reprogramming by software. The most significant five bits of the interrupt number that is sent is specified by this field. The least significant bit of the interrupt number sent is zero. The bit is written by a CSR write and read by a CSR read.

Completion Interrupt field (bits 35-36)—Enables an interrupt to the associated processor when the messaging and copy state machine completes the operation. The field also determines whether an interrupt is sent when the operation completes with an error of if it is sent independently from the status of the operation. Table 1 below specifies the encoding for the field.

TABLE 1

| Field Value | Function |
| --- | --- |
| 0–1 | Completion Interrupt Disabled |
| 2 | Completion Interrupt Enabled |
| 3 | Completion Interrupt only on Error |

Interrupt Number field (bits 37-41)—Specifies the most significant five bits of the interrupt number sent to the processor that initiated the request An interrupt is sent when either of two events occur:

When the messaging and copy state machine has completed accessing the input registers.

When the messaging and copy state machine completes the operation.

The least significant bit of the interrupt number is a zero for the first event, and a one for the second. The bit is written by a CSR write and read by a CSR read.

Length-1 field (bits 42-63)—Specifies the length of the messaging and copy operation. Messaging operations ignore the least significant 5 bits, forcing the length to be an integer number of memory lines (32-byte increments). Copies, however, may be any byte length. Notice that a value of zero in the field copies one byte (one memory line for messaging), and a value of all ones in the field will copy four megabytes of memory. The field is written by a CSR write and read by a CSR read.

Operation Context Register

Each EPAC 150 has two Operation Context CSRs, one for each processor. The operation context is applied to other CSRs in two ways. One is by arming a CSR and the other is by indicating that the armed CSR was triggered, that is, it performed a specific function.

Figure 2B:
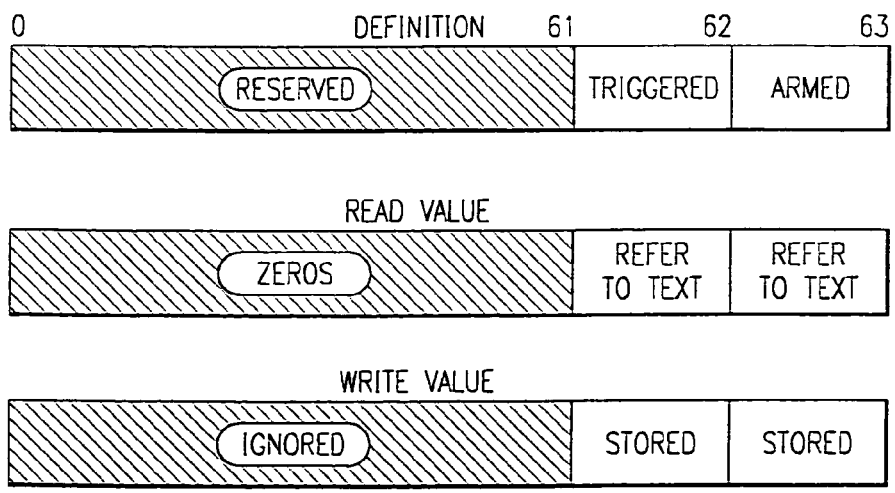
FIG. 2B illustrates the layout of the Operation Context register in a preferred embodiment enabling the claimed invention.

The format of the Operation Context register is shown in FIG. 2B. The fields of the CSR Operation Context register are defined as follows:

Armed field (bit 63)—Set by software to arm the functionality of specific EPAC processor CSRs. The EPAC CSRs armed by this bit include the Data Mover Input Command register.

The Armed bit is set by software and is cleared by either hardware or software.

Triggered field (bit 62)—Indicates that a CSR operation executed when the Armed bit was set. The Triggered bit is cleared by software and is set by hardware.

Table 1A below shows the Armed and Triggered bit transitions as controlled by hardware when an operation is issued, i.e. when software accesses one of the operation address CSRs.

TABLE 1A

State Transition when Operation Issued

| Present Value | | Next Value | |
|---|---|---|---|
| Triggered | Armed | Triggered | Armed |
| 0 | 0 | 0 | 0 |
| 0 | 1 | 1 | 0 |
| 1 | 0 | 0 | 0 |
| 1 | 1 | 1 | 1 |

Table 1B below shows the Armed and Triggered bit transitions as controlled by hardware when a TLB invalidate transaction is detected.

TABLE 1B

State Transition when TLB Invalidate detected

| Present Value | | Next Value | |
|---|---|---|---|
| Triggered | Armed | Triggered | Armed |
| 0 | 0 | 0 | 0 |
| 0 | 1 | 0 | 0 |
| 1 | 0 | 0 | 0 |
| 1 | 1 | 1 | 1 |

Source/Destination Physical Page Frame Register

There are two Source/Destination Physical Page Frame CSRs on each EPAC 150 that specify the source and destination of messaging and data copy operations.

The registers are only written when the Input Command register's Ready bit is zero and the CSR Operation Context register's Armed bit is a one. The register may be read at any time.

Figure 3:
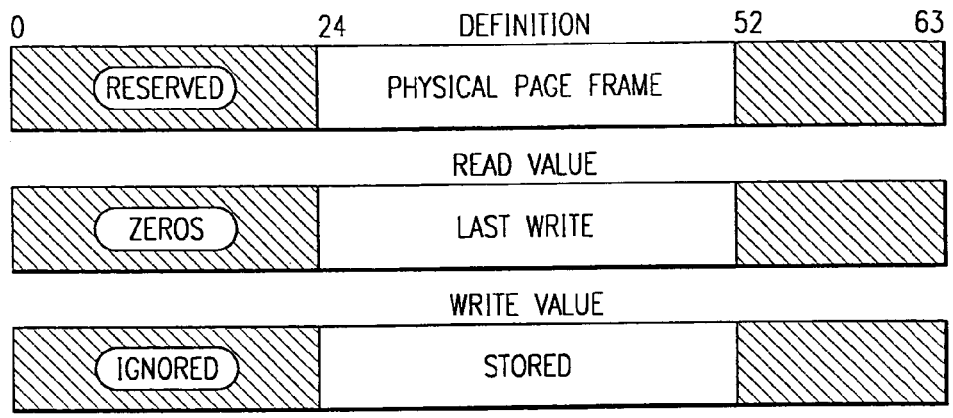
FIG. 3 illustrates the layout of the Source/Destination Physical Page Frame register in a preferred embodiment enabling the claimed invention.

The format of the Physical Page Frame register is shown in FIG. 3. The field of this register is defined as follows:

Physical Page Frame field(bits 24–51)—Indicates the physical page frame of a 40-bit address used herein for exemplary purposes. If a Block Translation Table (BTT) is being used, the field specifies the address of the BTT. Otherwise, the field specifies the source or destination page for the copy operation.

For messaging operations, the Destination Physical Page Frame register must be programmed with the Node ID and Virtual Ring of the destination EMAC 160 receiving the message.

Source/Destination Offset Register

There are two Source/Destination Offset CSRs on each EPAC 150 to specify the offset for the source and destination of a message or copy operation.

The registers are only written when the Input Command register's Ready bit is zero and the CSR Operation Context register's Armed bit is a one. The register may be read at any time.

Figure 4:
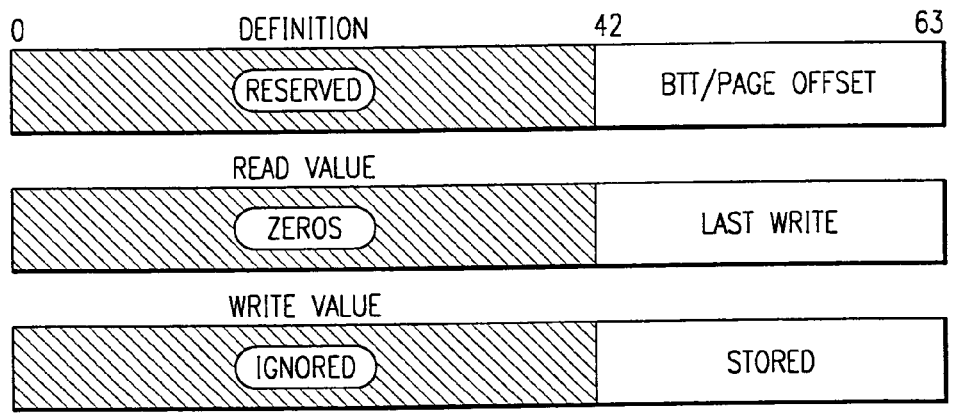
FIG. 4 illustrates the layout of the Source/Destination Offset register in a preferred embodiment enabling the claimed invention.

The format of the Offset register is shown in FIG. 4. The field of the register is defined as follows:

BTT/Page Offset field (bits 42–63)—Is used in one of two ways. When a Block Translation Table is being used, the most significant 10 bits specify the index into the BTT and the least significant 12 bits specify the offset into the selected Block Table Entry ("BTE") memory page. When a Block Translation Table is not being used, the field is used as the offset into a page of memory. With 22-bits, the offset within a page may be up to 4 Megabytes in size for support of larger page sizes.

For messaging operations, the Destination Offset register need not be programmed.

Operation Status Queue Register

Multiple Operation Status Queue registers are provided on each EPAC 150, one for each processor attached thereto. In the embodiment illustrated on FIG. 1A, there are two processors CPU 0 and CPU 1, and so two Operation Status Queue registers are provided. Status is inserted in the status queue in the order that the operations complete. Note that this order may not be the order that the operations were issued if errors have occurred.

Figure 5:
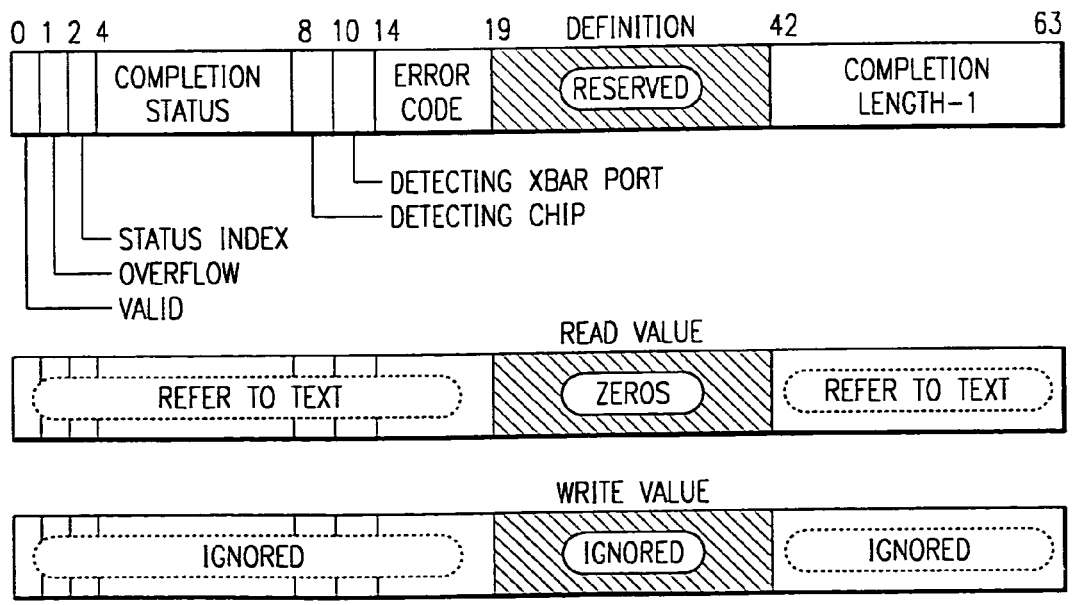
FIG. 5 illustrates the layout of the Operation Status Queue register in a preferred embodiment enabling the claimed invention.

The format of the processor Operation Status Queue register is shown in FIG. 5. The fields of the Operation Status Queue register are defined as follows:

Valid field (bit 0)—Indicates that the Status Queue has valid messaging and copy state machine completion status. The bit is set when the state machine has completed and writes status into the queue. The bit is cleared when the status is read and no other valid status remains in the status queue. A CSR read will read the value, and a CSR write has no effect. Reset clears the bit.

Overflow field (bit 1)—Indicates that a status queue overflow occurred resulting in the loss of status information. The bit is set when a status queue is full and the messaging and copy state machine has completed an operation and its status is destined for that queue. The bit is cleared when the status register is read. A CSR write does not effect the value of the bit. Reset clears the bit.

Status Index field (bits 2–3)—Is used by software to associate operation status with the proper software initiated operation. The two bits are a direct copy of Input Command register's Status Index field at the time the Ready bit was set.

Completion Status field (bits 4–7)—Indicates the messaging and copy state machine completion status. Table 2 below shows the possible Completion Status field values.

TABLE 2

| Field Value | Completion Status |
|---|---|
| 0 | Operation completed successfully |
| 1 | Date Mover detected error |
| 2 | Source Memory transaction error |
| 3 | Destination Memory transaction error |
| 4 | Source BTE transaction error |
| 5 | Destination BTE transaction error |
| 6 | Message Allocate transaction error |
| 7 | Message Completion transaction error |
| 8 | Source Memory parity error |
| 9–F | Reserved |

A CSR read will read the value, and a CSR write has no effect.

When an operation finishes with status value zero (successful operation), the fields Detecting Chip, Detecting Xbar Port, and Error Code contain no useful information. For status value of one, the Error Code field indicates the type of error detected. These error codes are defined in the Error Code definition below. For status values 2 through 8, the fields Detecting Chip, Detecting Xbar Port, and Error Code are the values returned from the transaction that returned the error.

Detecting Chip (bits 8–9) and Detecting Xbar Port (bits 10–13) fields—Obtained directly from a transaction error response. The fields specify which chip or crossbar port detected the error.

Error Code field (bits 14–18)—Specifies the type of error that caused the operation to fail. Error codes for a completion status value of one are listed below in Table 3.

TABLE 3

| Field Value | Error Code |
| --- | --- |
| 0 | TLB Purge Aborted Operation |
| 1 | Insufficient Queue space for Message |
| 2 | Insufficient Memory for Message |
| 3 | Message Reception Disabled |
| 4 | Source BTE Translation Invalid |
| 5 | Destination BTE Translation Invalid |
| 6 | Transaction Tuned Out |
| 7–1F | Reserved |

Completion Length-1 field (bits 42–63)—Indicates the amount remaining to copy when the operation finished. Notice that the field is only valid if the operation was aborted with the detection of a TLB Purge. The field will have the value of minus one when the operation completed successfully and zero or greater if the operation was aborted. The value is used to reissue an operation when it was aborted due to a TLB Purge being detected. A CSR read will read the value, and a CSR write has no effect.

Message Reception Area Configuration Register

Figure 6:
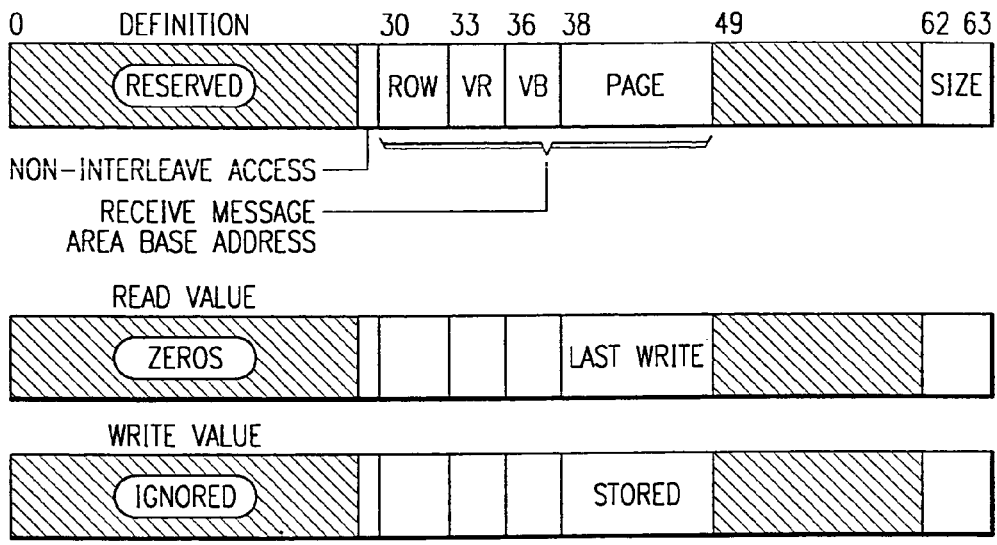
FIG. 6 illustrates the layout of the Message Reception Area Configuration register in a preferred embodiment enabling the claimed invention.

There is one Message Reception Area Configuration register on each EMAC 160 to specify the base address for the region of memory used to receive messages. The format of the Configuration registers is shown in FIG. 6. The fields of the Message Reception Area Configuration register are defined as follows:

Non-interleaved Access (bit 29), Row (bits 30–32). Virtual Ring (bits 33–35), Virtual Bank (bits 36–37), and Page (bits 38–48) fields—Specify the Message Reception Area Base Address.

Size field (bits 62–63)—Specifies the size of the Message Reception Area. Table 4 shows the possible sizes for the Message Reception Area.

TABLE 4

| Field Value | Size |
| --- | --- |
| 0 | 32 Kbyte |
| 1 | 256 Kbyte |
| 2 | 2 Mbyte |
| 3 | 16 Mbyte |

Message Reception Area Offset Registers

There are two Message Reception Area Offset CSRs on each EMAC 160:

Message Reception Area Available Offset register—specifies the region of the message reception area available for new messages.

Message Reception Area Occupied Offset register—specifies the region presently occupied by messages.

One CSR specifies the offset into the message reception area where available space to receive messages starts and the other specifies where occupied memory starts.

Figure 7:
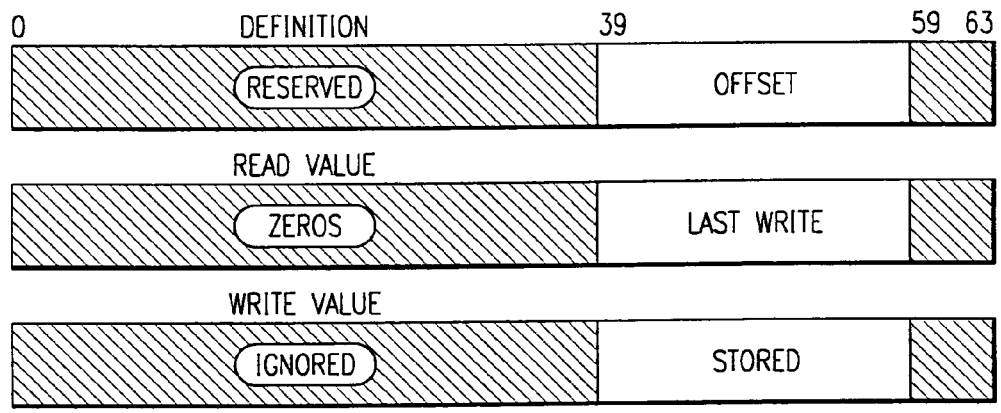
FIG. 7 illustrates the layout of the Message Reception Area Offset register in a preferred embodiment enabling the claimed invention.

The format of the Message Reception Area Offset registers is shown in FIG. 7. The field of the register is defined as follows:

Offset field (bits 39–58)—Specifies an offset into the message reception area. The register is normally read and written by hardware (to allocate space for new messages). It is read by hardware to check if sufficient available area exists for a new message and written by software to free memory consumed by previously received messages.

Notice that depending on the Size field of the Message Reception Area Configuration register, some of the most significant bits of the Offset field are not used and must be set to zero when written by software. Table 5 below shows the bits that are used for each possible size of the Message Reception Area.

TABLE 5

| Size Option | Bits used as Offset |
| --- | --- |
| 32 Kbyte | 10-bits (49–58) |
| 256 Kbyte | 13-bits (46–58) |
| 2 Mbyte | 16-bits (43–58) |
| 16 Mbyte | 19-bits (40–58) |

The Message Reception Area is full when the Message Reception Area Available Offset is equal to the Message Reception Area Occupied Offset in the bits specified in Table 5, and the single bit more significant to that specified in the table is different. Note that bit 39 of the Offset field is never used as an offset in to the Message Reception Area, but rather is only used to determine the full status of the Message Reception Area when the size is 16 Mbyte.

Message Completion Queue Configuration Register

Each EMAC 160 has one Message Completion Queue Configuration register that specifies the base address for a region of memory used to write message completion status (refer to section "Message Completion Queue area" described above).

Figure 8:
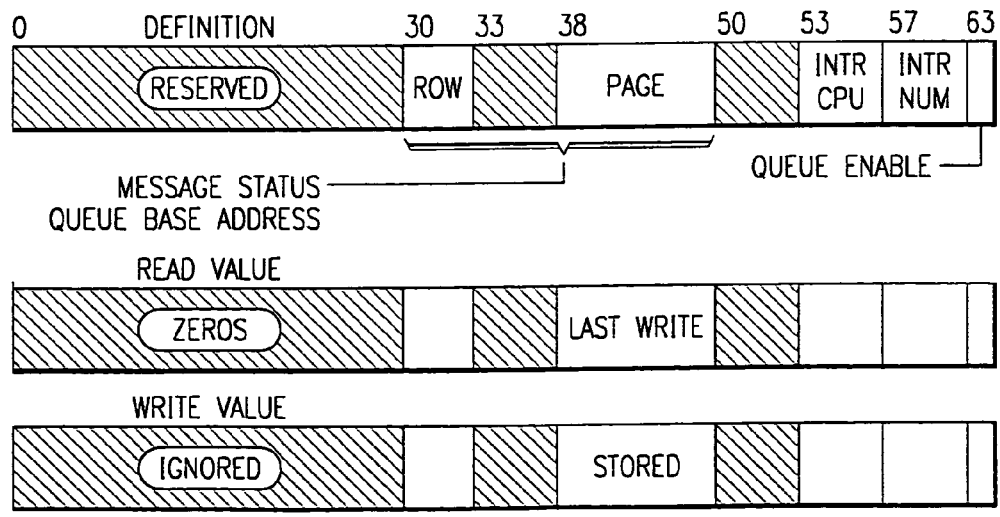
FIG. 8 illustrates the layout of the Message Completion Queue Configuration register in a preferred embodiment enabling the claimed invention.

The format of the configuration register is shown in FIG. 8. All fields of the register are read by a read access, and written by a write access. The fields of the Message Completion Queue Configuration register are defined as follows:

Row (bits 30–32) and Page (bits 38–49) fields—Specify the Message Completion Queue base address. The base address is specified by the Row and Pages fields of the 40-bit physical address. The Virtual Ring and Virtual Bank fields are not part of the base address because the hardware uses all banks on the specific EMAC.

Interrupt Processor field (bits 53–56)—Specifies which of the 16 processors within the destination node to interrupt when message completion status is placed in the message completion queue.

Interrupt Number field (bits 57–62)—Specifies the interrupt number used to interrupt a processor on the destination node when message completion status is placed in the message completion queue.

Queue Enable field (bit 63)—Enables receiving messages to the associated message reception area. The bit is cleared by reset.

Message Completion Queue Offset Registers

Each EMAC 160 has three Message Completion Queue Offset CSRs:

Message Completion Queue Reserve Offset—specifies the offset into the message completion queue memory area where space has been reserved for message completion status.

Message Completion Queue Write Offset—specifies the offset where received message status is written.

Message Completion Queue Read Offset—specifies the offset where message completion status is read.

Software must initialize these CSRs by writing a zero value, but, thereafter, only hardware needs to read or write the registers.

Figure 9:
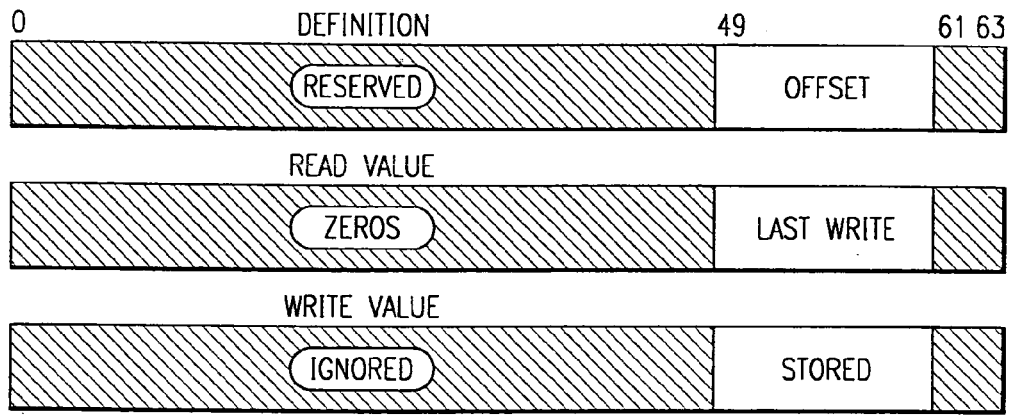
FIG. 9 illustrates the layout of the Message Completion Queue Offset register in a preferred embodiment enabling the claimed invention.

The format of the Message Completion Queue Offset registers is shown in FIG. 9. The field of the register is defined as follows:

Offset field (bits 49–60)—Specifies an offset into the message completion queue memory area. The most significant bit of the field (bit 49) is not part of the offset, but determines the full or empty status of the queue. The Message Completion Queue is full when bits 50–60 of the Message Completion Queue Read Offset are equal to bits 50–60 of the Message Completion Queue Write Offset register, and bit 49 of each register is different. The queue is empty when bits 49–60 of each offset register have the same value.

Message Allocation Address

Each EMAC 160 has a message allocation address. This CSR address is special in that it does not have a register associated with it but rather manipulates other CSRs when accessed. The operation performed is to check that space exists in the message reception area and message completion queue, and if it does exist, to allocate space in the reception area and reserve an entry in the message completion queue.

The following functionality is performed by an access to this address:

Checking that the Message Reception Area has been enabled to receive a message. This is performed by checking the Queue Enable bit of the Message Completion Queue Configuration register.

Checking that an entry exists in the Message Completion Queue. The information required for the check is the Message Completion Queue Reserved Offset and Message Completion Queue Read Offset registers. The check which is made is that the comparison of the two offsets do not result in queue full.

Checking that space exists in the message reception area. The information needed for this check is the length of the message, the Message Reception Area Available Memory Offset CSR, and the Message Reception Area Occupied Memory Offset CSR. The check which is made is that the occupied offset less the available offset is greater than the length of the message.

Returning status of the unsuccessful allocation attempt, if any of the above checks fail. Otherwise, information from the Message Reception Area Configuration register and the Message Reception Area Available Offset register are returned to the source node specifying the memory address.

Incrementing the Message Reception Area Available Offset register by the length of the message Incrementing the Message Completion Queue Reserved Offset by one indicating one less entry available.

Table 6 specifies the information which is included in the request packet which is sent to the Memory Allocation CSR address on EMAC 160 on the destination node.

TABLE 6

| Bits | Description |
| --- | --- |
| 17 | Length of message (zero implies one memory line) |

Table 7 lists the information which must be returned in the response packet.

TABLE 7

| Bits | Description |
| --- | --- |
| 2 | Status of allocation request<br>0 - Successful allocation<br>1 - Failure due to insufficient message Completion Queue Area space<br>2 - Failure due to insufficient Message Reception Area space<br>3 - Message reception disabled |
| 2 | Size of message reception area (used to control address wrap around) |
| 30 | Destination node memory offset (Non-interleaved Access, Row, Virtual Ring, Virtual Bank, Page, and Page Offset fields) |

The operation which accesses the Memory Allocation CSR address must contain information in both the request and response.

Message Completion Enqueue Address

Each EMAC 160 has a Message Completion Enqueue address that is special in that it does not have registers associated with it but rather other CSRs are manipulated when the address is written. The operation performed is to write the completion status to a memory-based message completion queue.

The message completion queue should not be full because a previous access to the Message Allocation CSR address will have reserved space in the queue for the completion status.

The functionality performed by a write to this address is listed below:

Writing of the completion status to the memory based message completion queue. The memory address to be written is formed by the Row and Page fields of the Message Completion Queue Configuration register and the Offset field of the Message Completion Queue Write Offset register. The data to be written is contained in the write request packet.

Incrementing by one the Offset field of the Message Completion Queue Write Offset register.

If the Message Completion Queue was empty prior to the accessing the Message Completion Enqueue address, the processor specified by the Message Completion Queue Configuration register is interrupted.

Figure 10:
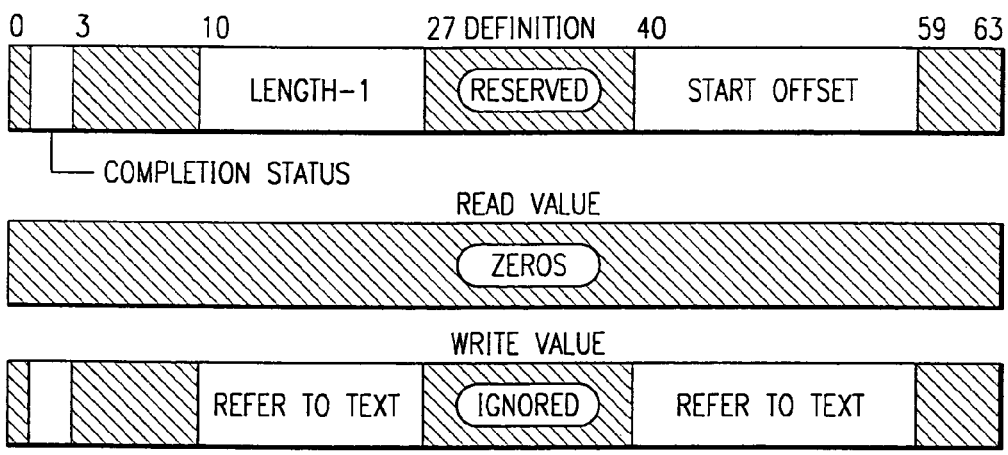
FIG. 10 illustrates the layout of the Message Completion Enqueue CSR address in a preferred embodiment enabling the claimed invention.

FIG. 10 shows the format for the request data sent with a write to a Message Completion Enqueue CSR address.

Message Completion Dequeue Address

Each EMAC 160 has a Message Completion Dequeue address that is special in that it does not have registers associated but rather manipulates other CSRs when the address is read. The operation performed is reading the completion status from a memory based message completion queue.

The functionality performed by a read to this address is listed below.

If the Message Completion Queue is empty, return a response with the Valid bit as zero.

Reading the completion status from the memory-based message completion queue. The memory address read is formed by using the Row, and Page fields of the Message Completion Queue Configuration register and the Offset field of the Message Completion Queue Read Offset register. The data which is read is returned in the response packet.

Incrementing by one the Offset field of the Message Completion Queue Read Offset register.

Figure 11:
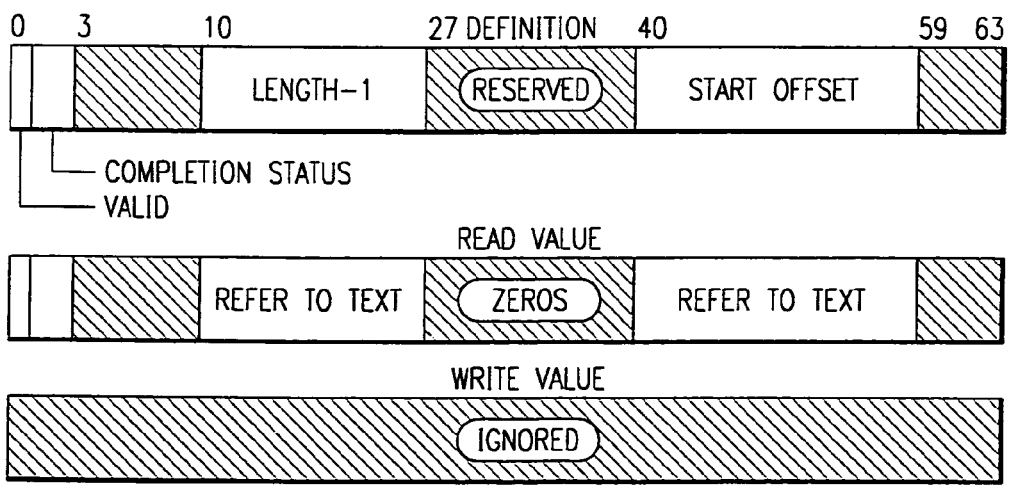
FIG. 11 illustrates the layout of the Message Completion Dequeue CSR address in a preferred embodiment enabling the claimed invention.

FIG. 11 shows the format for the response data returned from a read to a Message Completion Dequeue CSR address. The fields of the response data returned from a read to the address are defined as follows:

Valid field (bit 0)—Indicates the empty status of the Message Completion Queue at the time of the read access.

Completion Status field (bits 1–2)—specifies the completion status of a received message. Table 8 shows the possible Completion Status field values. The Valid bit indicates the empty status of the Message Completion Queue at the time of the read access.

TABLE 8

| Field value | Completion Status |
| --- | --- |
| 0 | Message Received Successfully |
| 1 | Message Aborted |
| 2–3 | Reserved |

For completion status values 0 and 1, the space for the message was allocated in the Message Reception Area and the memory must be freed.

Length-1 field (bits 10–26)—Specifies the length of the allocated memory in memory lines (32-byte increments) for the message. A zero value specifies one memory line (32 bytes) and a value of all ones specifies 131,072 memory lines (4 Mbytes).

Start Offset field (bits 40–58)—Specifies the offset in to the memory reception area to the start of the message.

Figure 12:
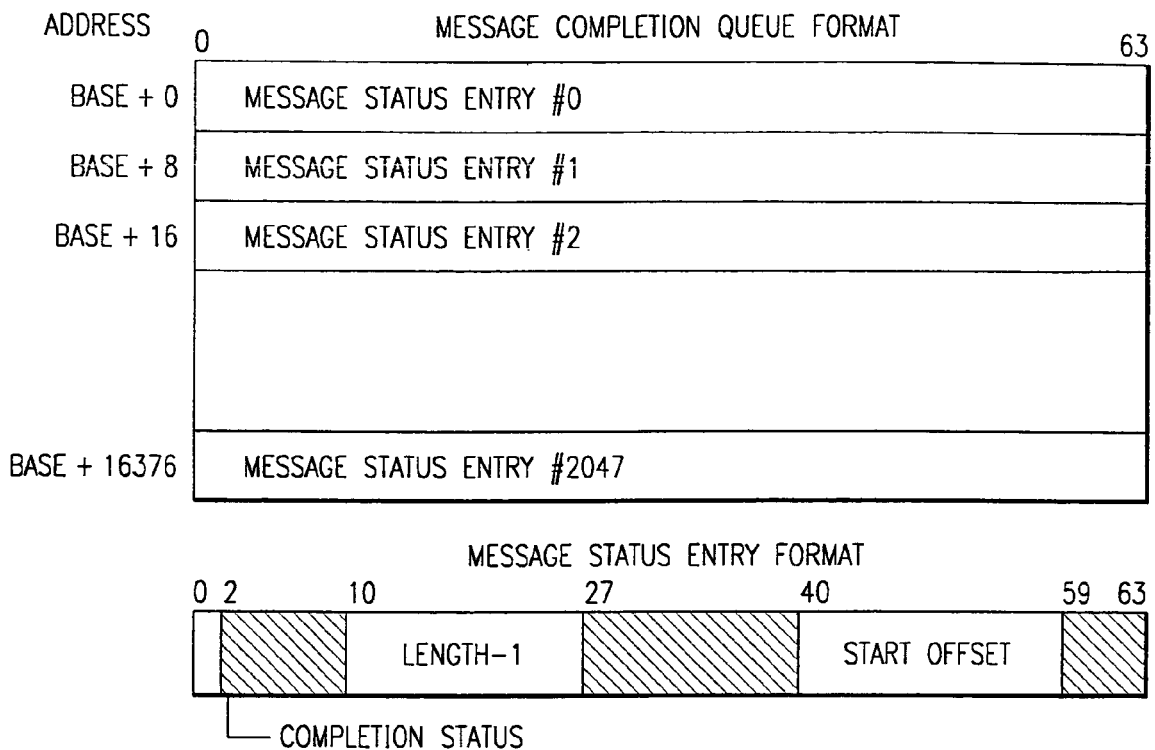
FIG. 12 illustrates the format for a Message Completion Queue and one of its entries in a preferred embodiment enabling the claimed invention.
Figure 13:
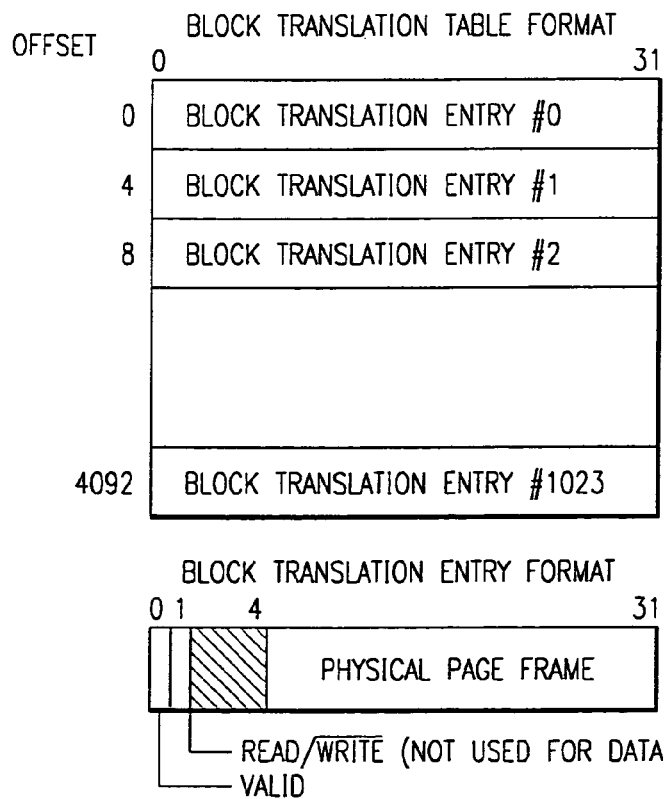
FIG. 13 illustrates the format for a Block Translation Table and one of its entities in a preferred embodiment enabling the claimed invention.

FIGS. 12 and 13 describe the memory structures used by the messaging and data copy hardware. The three data structures are:

Message Reception Area
Message Completion Queue
Block Translation Table

Message Reception Area

The message reception area is an operating system allocated region of memory to which messages can be written. The message reception area is controlled by hardware that allocates message space and writes the messages as they are received.

All accesses to message reception areas are through coherent memory accesses. A processor can copy a message out of the message reception area directly or by using the data copy hardware.

Message Completion Queue Area

The message completion queue area holds message completion status until software is ready to process the received message.

In the exemplary Hewlett-Packard Excalibur product, the size of each message completion queue area is fixed at 16 Kbytes. Each entry is 8 bytes in size, resulting in 2048 entries per queue. The message completion queue area resides in memory which is physically connected to the controlling EMAC 160.

The mapping of a queue entry to its physical memory address is shown below in Table 9. The Message Completion Queue Configuration register's Page field is referred to as Config. Page, and a Message Completion Queue Offset register's Offset field is referred to as the Entry Offset. Notice that the address is generated differently based on the value of the System Configuration register's Normal Memory Interleave field. This enables the software to allocate a contiguous region of memory to be used by all message completion queue areas for the EMACs on the local node.

TABLE 9

| Normal Memory Interleave | EMAC Memory Offset (Physical Address's Page, PgOfs, and LnOfs fields) |
| --- | --- |
| 0 | Page = Config. Page <0–10>, Entry Offset<1–3> PgOfs = Entry Offset <4–9>, Config. Page<11> LnOfs = Entry Offset <10–11>, 000 |
| 1, 2 | Page = Config. Page <0–9>, Entry Offset <1–4> PgOfs = Entry Offset <5–9>, Config. Page <10–11> LnOfs = Entry Offset <10–11>, 000 |
| 3 | Page = Config. Page <0–8>, Entry Offset <1–5> PgOfs = Entry Offset <6–9>, Config. Page <9–11> LnOfs = Entry Offset <10–11>, 000 |

FIG. 12 shows the format for a Message Completion Queue and one of its entries. The fields of the message status entry CSR are as follows:

Completion Status field (bits 0–1)—Specifies the completion status of a received message. Table 10 shows the possible Completion Status field values.

TABLE 10

| Field value | Completion Status |
| --- | --- |
| 0 | Message Received Successfully |
| 1 | Message Aborted |
| 2–3 | Reserved |

For completion status values 0 and 1, the space for the message was allocated in the Message Reception Area and the memory must be freed.

Length-1 field (bits 10–26)—Specifies allocated memory in number of memory lines (32-byte increments) for the message. A value of zero specifies one memory line (32 bytes), and a value of all ones specifies 131,072 memory lines (4 Mbytes).

Start Offset field (bits 40–58)—Specifies the offset into the Memory Reception Area to the start of the message.

Block Translation Table Definition

The Block Translation Table (BTT) provides the I/O system a means to translate from a peripheral's address space to physical memory. It specifies a mapping of contiguous addresses to pages of physical memory. The table is limited to a single page of memory, with each entry being a word (advantageously four bytes) in size.

Each entry in the table is called a Block Translation Entry (BTE), and it specifies the page frame for a page of physical memory. In the preferred embodiment, a page is 4096 bytes and the BTT specifies a maximum address space of 4 Megabytes. It will nonetheless be appreciated that other configurations may be selected, however, consistent with the scope of the present invention as claimed below.

FIG. 13 shows the format for a Block Translation Table and one of its entries. The fields of the BTE CSR are as follows:

Valid field (bit 0)—Indicates a valid entry. If the messaging and copy state machine needs to use an entry without the Valid bit set, the operation is aborted with completion status indicates the problem.

Read/Write field (bit 1)—Ignored by the messaging and copy state machine.

Physical Page Frame field (bits 4–31)—Indicates the page frame for either the source or destination of the operation.

Software Interface

The software interface for the messaging and data copy hardware consists of the following functions:
  reset and initialization
  programming the input registers
  obtaining operation completion status
  obtaining message completion status
  reading a message Reset and Initialization After the system is reset, all hardware will be in a state ready to accept and perform a copy operation. Reset disables all message reception queues. In order to send a message, the destination node Message Reception Area and Message Completion Queue CSRs must be initialized.

Although illustrated and described above individually, there are advantageously multiple EMACs in a fully configured node, each providing independent control of a message reception area. Any of the message queues may be disabled to reduce the amount of messaging memory. This does not reduce the bandwidth used for messaging, but rather decreases the number of independently managed message reception areas.

All memory used for message reception areas and the message completion queues must be wired-down (the term wired-down implies that the virtual to physical address translation must remain the same). The requirement starts from the time messaging is initialized (at boot time).

Programming the Input Registers

A message or data copy operation is initiated by programming the input registers. The following sequence initializes the input registers for a copy operation.

Step 1 Set CSR Operation Context register Armed bit
Step 2 Write to the Source Physical Page Frame register
Step 3 Write to the Source Offset register
Step 4 Write to the Destination Physical Page Frame register
Step 5 Write to the Destination Offset register
Step 6 Write to the Input Command register specifying all fields, and setting the Ready bit
Step 7 Check CSR Operation Context register's Triggered bit Step 1 arms the operation to detect when interrupts/traps overwrite the Data Mover input registers or change a virtual-to-physical address mapping. If either of these two events occur, then the Triggered bit will not be set for step 7.

Step 2 initializes the Source Physical Page Frame register. The register is written with one of two addresses. If a BTT is used to specify the source region, the register should be initialized with the base address of the BTT. Otherwise, the source region is contained within a single page of memory, and the register should be initialized with the address of that page of memory.

Step 3 initializes the Source Offset register. The register is initialized with the offset to the start of the source region. When the copy is from a single page of memory, the offset is the number of bytes into that page of memory. Otherwise the offset is the number of bytes from the beginning of the BTT (less than 4 Megabytes). When a BTT is used, the most significant 10 bits are the index into the BTT table, and the least significant 12-bits are the offset into the page.

Step 4 and Step 5 initialize the Destination Physical Page Frame and Destination Offset registers similarly to the Source registers of Step 2 and Step 3.

Step 6 initializes the Input Command register which sets the length and modes of the operation. The Ready bit should be set to one. The value of all other fields are set based on the type of message or copy required. Once this register is written, the messaging and copy state machine can immediately start on the operation.

Step 7 checks the Triggered bit of the CSR Operation Context register to determine if the operation was successfully started.

Bzero Operation

A memory zero operation is setup as above with the exception that Step 2 and Step 3 are skipped.

Messaging Operation

A message operation is setup as above with the exception that the Destination Physical Page Frame register need only contain the destination node and virtual ring information. Additionally, the Destination Offset register need not be written.

Initializing with Virtual Addresses

The Source or Destination Physical Page Frame registers can be initialized from a virtual address. To initialize with a virtual address, the LPA (Load Physical Address) instruction provides the virtual-to-physical address translation.

When either the source or destination address is obtained from non-wired virtual memory, the TLB Purge Abort Enable bit of the Input Command register must be set. This bit enables the messaging and copy state machine to abort the operation if a TLB purge transaction is detected prior to or during the copy operation. An aborted operation can be restarted to complete the operation.

Copy operations can be restarted with the length remaining to copy when the operation is aborted guaranteeing forward progress. An aborted message operation must be restarted with the original length. Forward progress is not guaranteed for messages which use virtual source addressing.

Determining when the Input Registers are Available

There are two ways to determine when the input registers are available to be programmed. First, an Input Command Register can be read at any time to determine the state of the Ready bit. When the bit is set, the messaging and copy state machine has control of the input registers, and software writes will be ignored. Once the bit is cleared by hardware, software may program the input registers to set up an operation. Software completes programming the input registers by setting the Ready bit.

Second, an interrupt can be sent to the processor when hardware clears the Ready bit. The interrupt is masked off within the processor, allowing the processor to poll the interrupt pending register to determine the availability of the input registers.

Obtaining Operation Completion Status

To obtain the status of messaging and copy operations, the processor reads the Operation Status Queue register. There are two status queues maintained by an EPAC, one for each processor attached to the chip. Each queue is three elements deep. The messaging and copy state machine puts status into a queue when an operation finishes, and an entry is removed from a queue when the Operation Status Queue register is read. The ordering may not be maintained between operations programmed in the input registers and status read out of the Operation Status Queue register. The Status Index field of the Input Command register is used to specify an operation tag, and the value of the Status Index field read from the Operation Status Queue register is used to associate the status to the initiating operation.

An interrupt may be sent to a processor at the completion of a messaging or copy operation. The interrupt number is specified by the Interrupt Number field of the Input Command register. The processor to which the interrupt is sent is the processor which initialized the Input Command register with the operation.

Obtaining Message Completion Status

When message completion status is enqueued, a processor is interrupted. The processor reads each Message Completion Queue entry, one at a time determining whether the message arrived successfully, the starting offset of the message, and the length. A message completion queue entry with the Valid bit cleared indicates that the queue is empty.

Reading a Message

The start and length of a message is obtained by reading a Message Completion Queue entry as described in the previous section, "Reading a message." A message can be accessed from memory (whether it is interleaved or non-interleaved) by either the data copy hardware, or by the processor copying the message directly.

Freeing Message Allocation Area Memory

Once a message has been copied out of the message reception area, the memory it was occupying must be freed for reuse. The process of freeing memory is complicated by the different order in which memory is allocated and memory is freed. Due to this complication, a software structure is used to collate and sort the freed memory by the use of a simple bit map. To free a message, the appropriate bits of the bit map are set. Once all bits of messages to be freed are set, the bits are scanned from the current Message Reception Area Occupied Offset register value looking for the first occurrence of a cleared bit. The Message Allocation Area Occupied Offset register is then updated to the offset associated with the end of the string of bits which were set. Finally, the string of set bits are cleared.

Messaging on Highly Available Systems

In a highly available system, both interleaved and non-interleaved messages must be received by each node. Furthermore, these two types of messages must be managed separately to avoid corruption from nodes that have either software or hardware problems.

A highly available system will setup some number of the EMACs within a node to receive interleaved messages, some to receive non-interleaved messages, and possibly some EMACs to have their message reception areas disabled.

The foregoing discussion has described in detail the optimization of data movement operations in the context of messaging. It will be further appreciated, as described in the "Summary" section above, that other data movement operations, such as data copying and pipelining, may also be optimized in an architecture as disclosed herein.

The foregoing discussion also discloses the basis for additional novelty in data copy operations by monitoring for TLB purges during the operation itself while it is being performed by hardware. A TLB purge alarm mechanism enables the mapping integrity of virtual memory page to physical memory page translations to be maintained during the hardware-based data copy operations. In the prior art, where data copy operations are performed in part by software, the software can also control mapping integrity. The TLB purge alarm mechanism provides that control under the claimed invention, where operations previously performed by software are now performed by hardware.

Generally, data copying can be specified from either a physical page in memory or from a virtual page in memory. A virtual page requires additional mapping to translate that virtual page to a physical page before data movement can actually begin between physical memory locations. A problem arises, however, if some other functionality of the computer changes the mapping during the process of issuing the data copy operation or actually moving the data. When this occurs, the operation must be stopped and re-started (advantageously from the stopping point) once accurate mapping has been re-established. Detection of the need to stop and wait for a re-start is enabled by a TLB purge alarm, described now with reference to FIG. 15.

Figure 15:
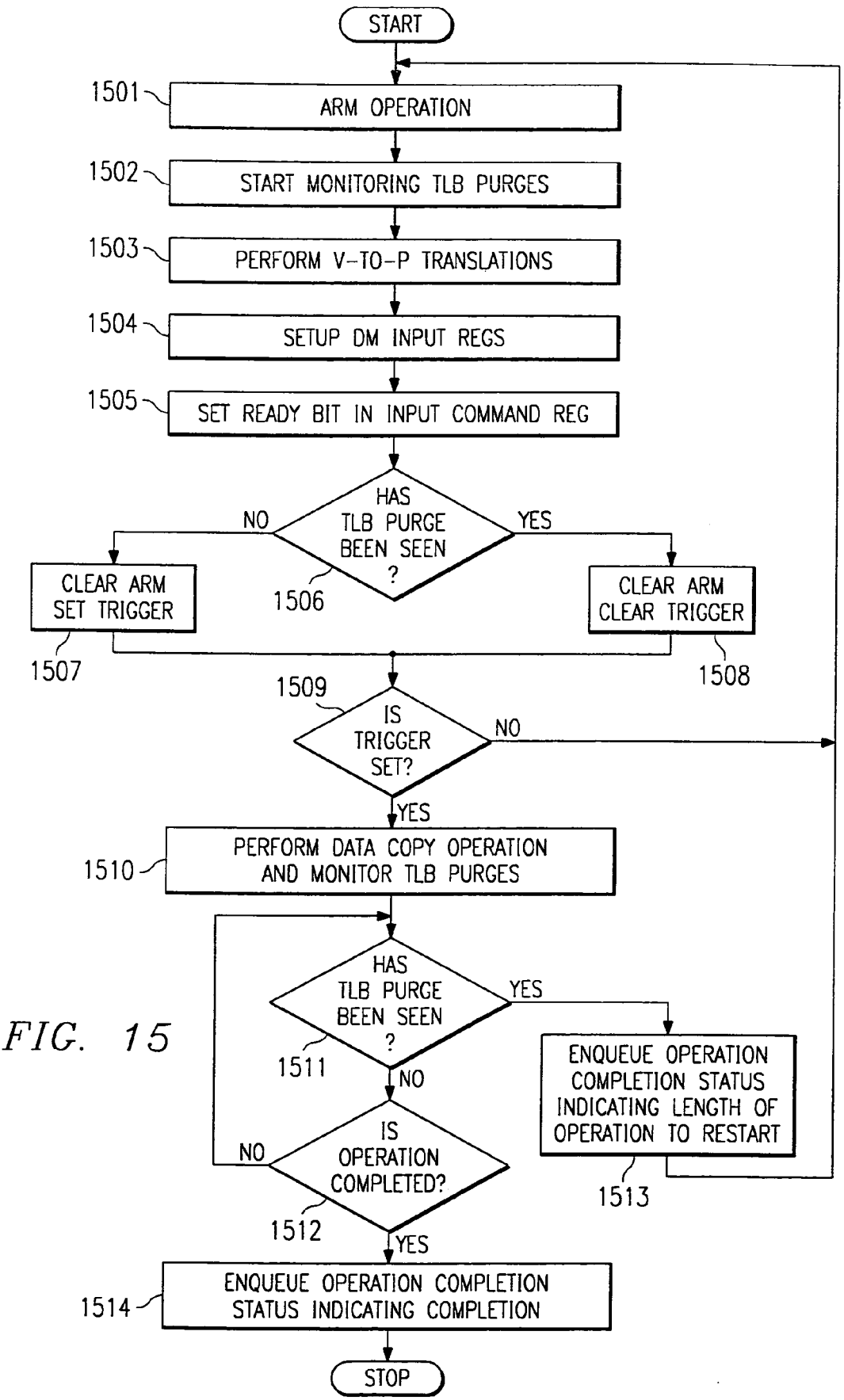
FIG. 15 is a flow diagram illustrating operation of a TLB purge alarm mechanism of the claimed invention.

As noted above, a TLB purge is a purge of the Translation Lookaside Buffer, indicating to a processor that there has been a change in virtual page to physical page translation. Referring to FIG. 15, the TLB purge alarm mechanism is armed in block 1501 prior to starting the data copy operation. In the exemplary architecture configuration described above with reference to FIGS. 1A and 14, this is done by writing to the Operation Context CSR, described above in association with FIG. 2B. It will be noted in reference to FIG. 2B that the Operation Context CSR is illustrated having an armed bit and a triggered bit. Accordingly, setting the armed bit in that Operation Context CSR instructs the hardware that an operation controlled by the TLB purge alarm is being set up.

The TLB purge alarm mechanism then starts monitoring for TLB purges in block 1502. While this monitoring continues, virtual to physical translation commences in block 1503 according to the currently-prescribed mapping. This translation is done for both the source and the destination locations in the data copy operation specified. Once this translation is complete, the data mover registers are set up in preparation for the copy operation (block 1504), and the "ready" bit in the Input Command CSR (refer back to FIG. 2A) is set (block 1505). The setting of the Input Command CSR "ready" bit in block 1505 informs the hardware that all preparations for actual data movement have now been completed.

At this point, the hardware then looks in block 1506 to see if any TLB purges have occurred since the mechanism was armed in block 1501. If none have occurred, then the Operation Context CSR "armed" bit is cleared and the Operation Context CSR "triggered" bit is set (block 1507). Alternatively, if one or more TLB purges have occurred, then the Operation Context CSR "armed" bit is cleared and the Operation Context CSR "triggered" bit is also cleared (block 1508). Next, in block 1509, the Operation Context CSR "triggered" is examined. If it is clear (i.e. a TLB purge has occurred), then the data copy operation is returned to block 1501. If, on the other hand, it is set (i.e. no TLB purges have occurred), then the data copy operation may be performed.

With continuing reference to FIG. 15, the data copy operation is commenced in block 1510. Note also in block 1510 that TLB purge monitoring continues while data copying is in progress. This is to ensure forward progress. If a TLB purge is detected before the copy operation is complete, then the mechanism stops the operation at that point and advantageously enqueues status information specifying how much data remains to be transferred to complete the operation (blocks 1511 and 1513). Processing returns to block 1501. When the data copy operation is eventually restarted, the data mover uses this enqueued status information to resume the data copy operation from the point at which it aborted.

On the other hand, if a TLB purge is not detected in block 1511 during the data copy operation, then the operation completes successfully (block 1512). In block 1514, the hardware enqueues the operation completion status queue indicating the successful completion.

Note further that TLB purge monitoring is not specific to the memory addresses that are being translated. The mechanism monitors and triggers upon any TLB purge affecting any memory address(es). Note also that a TLB purge is generally an infrequent event, and so the precautions offered by the TLB purge alarm mechanism as described above will maintain the integrity of hardware-driven data copy operations while not substantially affecting run time. Moreover, the run time on hardware, even with a TLB purge alarm enabled, is dramatically faster than the equivalent operation performed by software.

It will be further appreciated that the TLB purge alarm mechanism as described herein is not limited to use in data copy operations. It is also highly advantageous in other processor operations such as "Fetch and Increment" and "Fetch and Decrement".

Although the claimed invention and its advantages have been described in detail, it should be understood that various changes, substitutions and alterations can be made herein without departing from the spirit and scope of the invention as defined by the appended claims. In particular, it has already been noted that exemplary use has been made of Hewlett-Packard's Excalibur product to describe the invention, whose system design selects parameters that illustrate just one configuration on which the claimed invention may be enabled. It will be seen that variables within said system design and configuration may be changed without departing from the spirit and the scope of the invention.

I claim:

1. A method for controlling virtual memory address translation during data movement operations, comprising the steps of:
   monitoring, as a hardware operation, for an occurrence of a translation lookaside buffer (TLB) purge during setup and execution of a data movement operation from virtual memory;
   upon detection of a TLB purge prior to completion of the data movement operation, aborting the data movement operation pending reestablishment of accurate virtual-memory-to-physical-memory mapping; and
   enqueuing status information on whether the data movement operation completed or was aborted.

2. The method of claim 1, in which said status information includes identification of data that was successfully moved prior to an abort.

3. The method of claim 1, in which the data movement operation is a data copying operation.

4. The method of claim 1, wherein said occurrence of a TLB purge is indicative that a change in virtual-memory-to-physical-memory mapping has occurred.

5. A method for controlling virtual memory address translation during data movement operations enabled in a hardware environment, comprising the steps of:
   monitoring, as a hardware operation, for an occurrence of a translation lookaside buffer (TLB) purge during setup and execution of a data movement operation from virtual memory;
   upon detection of a TLB purge prior to completion of the data movement operation, aborting the data movement operation pending reestablishment of accurate virtual-memory-to-physical-memory mapping; and
   enqueuing status information on whether the data movement operation completed or was aborted.

6. The method of claim 5, wherein said occurrence of a TLB purge is indicative that a change in virtual-memory-to-physical-memory mapping has occurred.

7. The method of claim 5 further comprising:
   enqueuing status information including identification of data that was successfully moved prior to the abort.

8. Hardware for controlling virtual memory address translation during data operations involving physical movement of data, the hardware comprising:
   means for setting a first flag upon initiation of a data operation;
   means for periodically monitoring for translation lookaside buffer (TLB) purges;
   means for translating virtual address space to physical address space;
   means for setting up one or more input registers on a data mover;
   means, responsive to said means for translating and said means for setting up, for clearing the first flag if a TLB purge has been detected; and
   means for aborting the data operation and then enqueuing a first operation completion status if a TLB purge is detected before physical movement of data is complete.

9. The hardware of claim 8, in which the first operation completion status identifies data that was successfully moved prior to the abort.

10. The hardware of claim 8, in which the data operation is a data copying operation.

11. The hardware of claim 8, in which the means for clearing the first flag is enabled if a TLB purge has been detected before physical data.

12. The hardware of claim 8, wherein an occurrence of a translation lookaside buffer (TLB) purge during setup and execution of a data movement operation from virtual memory is indicative that a change in virtual-memory-to-physical-memory mapping has occurred.

13. The hardware of claim 8 further comprising:
   means, responsive to said means for translating and said means for setting up, for clearing the first flag and setting a second flag if a TLB purge has not been detected;
   means for examining the second flag; and
   means for commencing physical movement of data if the second flag is set.

14. The hardware of claim 13, in which the means for clearing the first flag and setting a second flag is enabled if a TLB purge has not been detected before physical data movement is to commence.

15. The hardware of claim 8 further comprising:
   means for enqueuing a second operation completion status if a TLB purge is not detected before physical movement of data is complete.

16. The hardware of claim 15, in which the second operation completion status indicates completion of the data operation.

* * * * *

UNITED STATES PATENT AND TRADEMARK OFFICE
CERTIFICATE OF CORRECTION

| | | |
|---|---|---|
| PATENT NO. | : 7,117,338 B2 | Page 1 of 1 |
| APPLICATION NO. | : 10/650105 | |
| DATED | : October 3, 2006 | |
| INVENTOR(S) | : Tony M. Brewer | |

It is certified that error appears in the above-identified patent and that said Letters Patent is hereby corrected as shown below:

In column 5, line 63, delete "110" and insert -- I/O --, therefor.

Signed and Sealed this

Thirtieth Day of December, 2008

JON W. DUDAS
*Director of the United States Patent and Trademark Office*